(12) United States Patent
Hall et al.

(10) Patent No.: US 10,377,263 B1
(45) Date of Patent: Aug. 13, 2019

(54) SHIFTER FOR A BATTERY-POWERED VEHICLE

(71) Applicants: David R. Hall, Provo, UT (US); Stephen Hall, Draper, UT (US); Kevin Slater, Provo, UT (US)

(72) Inventors: David R. Hall, Provo, UT (US); Stephen Hall, Draper, UT (US); Kevin Slater, Provo, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/013,792

(22) Filed: Jun. 20, 2018

(51) Int. Cl.
| | |
|---|---|
| *B60L 15/20* | (2006.01) |
| *B60L 11/18* | (2006.01) |
| *G05G 1/04* | (2006.01) |
| *G05G 5/03* | (2008.04) |
| *H02P 3/02* | (2006.01) |
| *H02P 3/14* | (2006.01) |
| *G08B 6/00* | (2006.01) |
| *G05G 5/05* | (2006.01) |

(52) U.S. Cl.
CPC ........... *B60L 15/2009* (2013.01); *B60L 11/18* (2013.01); *G05G 1/04* (2013.01); *G05G 5/03* (2013.01); *G05G 5/05* (2013.01); *G08B 6/00* (2013.01); *H02P 3/02* (2013.01); *H02P 3/14* (2013.01); *B60Y 2200/91* (2013.01)

(58) Field of Classification Search
CPC .................................................. B60L 15/2009
USPC ..................................................... 318/139, 34
See application file for complete search history.

(56) References Cited

U.S. PATENT DOCUMENTS 7,825,616 B2 * 11/2010 Clark ..................... B60L 3/108
                                                              318/139

* cited by examiner

*Primary Examiner* — David Luo
(74) *Attorney, Agent, or Firm* — Hall Labs LLC (57) ABSTRACT

In one aspect, the invention is a shifter for a vehicle driven by an electric motor powered by a battery. The shifter includes a lever with one end adapted to accommodate the hand of a user and another end moveably attached to a base mounted on the vehicle. The base includes a mechanism biasing the lever into an equilibrium position and providing haptic feedback when moved in one direction out of the equilibrium position. The shifter also includes at least one sensor adapted to detect when the lever is moved in the one direction and to send a downshift signal to a processor. The processor is adapted to switch the motor to a power generation mode in response to the signal, thereby charging the battery and slowing the vehicle. The net effect is to simulate downshifting a manual transmission in a gas-powered vehicle. In another aspect, the base includes a mechanism providing haptic feedback when moved to one of a plurality of positions. The shifter also includes a plurality of sensors adapted to detect when the lever is moved to one of the plurality of positions.

15 Claims, 5 Drawing Sheets

SHIFTER FOR A BATTERY-POWERED VEHICLE

TECHNICAL FIELD

This invention relates to electric vehicles and shifters.

BACKGROUND

Advances in automotive technology have brought historic convenience and luxury to a demanding consumer market. While the general trend of demand has been to refine and modernize, consumers have also begun indicating a desire for classic features melded with cutting-edge technology. One of the challenges in building a modern vehicle that stirs up fond nostalgia in consumers is giving the impression the vehicle is rooted in classic design and functionality while still providing all the benefits of modern advances in technology. An example of this would be imitating the sound of an internal combustion engine in an electric vehicle. Another example is described in U.S. Pat. No. 9,890,849 which shows a shifter for a vehicle adapted to provide haptic feedback to the driver when shifting.

SUMMARY

In one aspect, the invention is a shifter for a vehicle driven by an electric motor powered by a battery. The shifter includes a lever with one end adapted to accommodate the hand of a user and another end moveably attached to a base mounted on the vehicle. The base includes a mechanism biasing the lever into an equilibrium position and providing haptic feedback when moved in one direction out of the equilibrium position. The shifter also includes at least one sensor adapted to detect when the lever is moved in the one direction and to send a downshift signal to a processor. The processor is adapted to switch the motor to a power generation mode in response to the signal, thereby charging the battery and slowing the vehicle. The net effect is to simulate downshifting a manual transmission in a gas-powered vehicle.

In another aspect, the invention is a shifter for a vehicle driven by an electric motor powered by a battery. The shifter includes a lever with one end adapted to accommodate the hand of a user and another end moveably attached to a base mounted on the vehicle. The base includes a mechanism providing haptic feedback when moved to one of a plurality of positions. The shifter also includes a plurality of sensors adapted to detect when the lever is moved to one of the plurality of positions. The processor is adapted to switch the motor to a level of power according to the signal received by one of the plurality of sensors thus simulating shifting a manual transmission in a gas-powered vehicle.

In one preferred embodiment the lever has three positions. An equilibrium position; a forward position which activates a sensor and sends a signal to a processor which activates the electric motor to draw power from the battery to propel the vehicle forward; and a back position which sends a signal to the processor to reverse the electric motor to generate power to be stored in the battery thus slowing the vehicle and simulating downshifting a manual transmission in a gas-powered vehicle.

Another embodiment allows the driver to select a level of power generated by the motor through repeated movement of the lever forward. Each time the driver pushes the lever forward it increases the level of power from the motor which simulates upshifting in a standard gas-powered vehicle. Likewise, the driver may select a level of regeneration through repeated movement of the lever backward. Each time the driver pushes the lever backward it increases the level of power generated by the motor to be stored in the battery which simulates downshifting in a standard gas-powered vehicle.

Another embodiment has a base with multiple positions that the lever may be moved to. When the lever is moved into one of these positions it activates a sensor that sends a signal to the processor. This signal informs the motor at what level of power to be produced by the motor or what level of regeneration to be recovered. A movement from a first position to a second position to a third position simulates upshifting while a movement from a third position to a second position to a first position simulates downshifting. Higher positions may be included each representing a level of power.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, the term "shifter" is intended to refer to the device a driver uses to simulate shifting gears in a gas-powered vehicle, even though there may be no actual shifting of gears in a battery-powered vehicle. Likewise, the term "downshift," as in "downshift signal" is intended to refer to the simulation of downshifting of gears in a gas-powered vehicle, even though there may be no actual downshifting of gears in a battery-powered vehicle.

The term "simulate," along with its various forms, as used in the phrases "simulating shifting" or "simulating downshifting" is intended to refer to producing in the battery-powered vehicle at least one of the same physical effects that would be experienced when shifting or downshifting a gas-powered vehicle, such as speeding up or slowing down.

The term "forward" preferably refers to a direction toward the front of the vehicle, while the term "back" preferably refers to a direction toward the back of the vehicle. Nevertheless, in certain alternative embodiments, moving the shifter "forward" and "back" may refer to different directions, such as toward or away from the driver.

Figure 1:
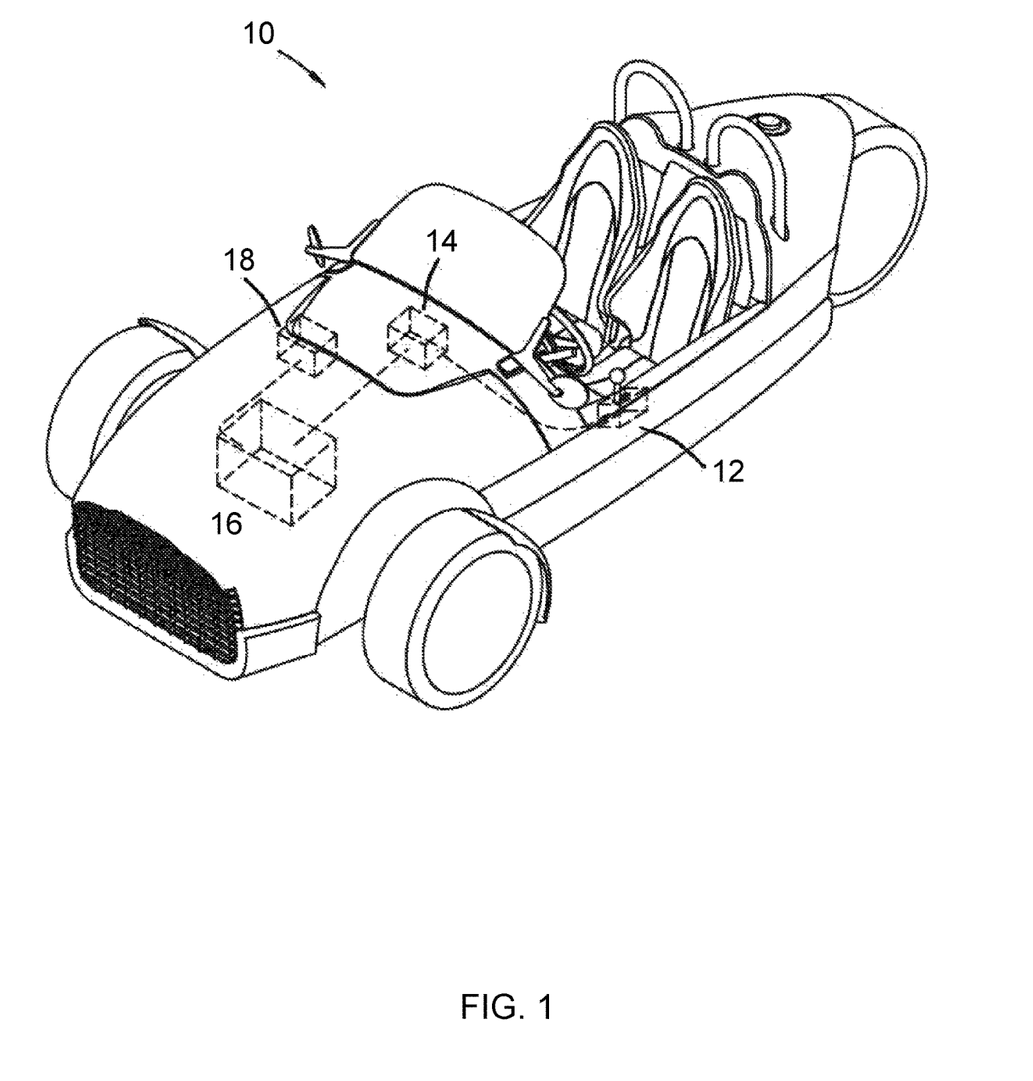
FIG. 1 is a perspective view of an electric vehicle using a regenerative motor with a shifter.

Referring to FIG. 1, vehicle 10 is a three-wheeled vehicle with an electric motor shown schematically at 16. However, the vehicle may be any type of battery-powered vehicle including a two-wheeled vehicle, a four-wheeled vehicle, or any number of wheeled vehicles, an aircraft, or a watercraft. Shifter 12 is disposed on the side of vehicle 10 next to the driver. However, the shifter may be disposed anywhere within vehicle such as on a dashboard or steering wheel.

When shifter 12 is moved forward from an equilibrium position spring 21 pushes shifter 12 back to the equilibrium position. When moved back from an equilibrium position spring 23 pushes the shifter forward to the equilibrium position. When moved forward shifter 12 activates electronic switch 30 that sends a signal to processor 14. Processor 14 sends a signal to motor 16 to draw power from battery shown schematically as 18 to propel vehicle 10 forward. When shifter 12 is moved back from the equilibrium position spring 23 pushes the shifter forward to the equilibrium position. When moved back shifter 12 activates an electronic switch 30 that sends a signal to processor 14. Processor 14 sends a signal to motor 16 to generate power to be stored in battery 18 thus slowing the vehicle. Electronic switch 30 includes elongated body 32 and switch arm 34.

In the preferred embodiment, shifter 12 has two positions it may be moved to, other than the equilibrium position. Moving the shifter forward activates electronic switch 30 and sends a signal to processor 14 which activates electric motor 16 to draw power from battery 18 to propel vehicle 10 forward. Moving shifter 12 back activates electronic switch 30 and sends a signal to processor 14 to reverse electric motor 16 to generate power as a regenerative motor to be stored in battery 18 thus slowing vehicle 10. In this embodiment reverse on vehicle 10 is achieved through the use of another invention disposed within vehicle 10 and shifter 12 has no position for reverse.

Other embodiments include the function of changing the level of power generated by the motor through repeated movement of the shifter forward to activate a switch. In the depicted embodiment, each time the driver pushes shifter 12 forward activating the switch 30, a signal is sent to the processor 14 to increase the level of power generated by motor 16 to propel vehicle 10 forward. This embodiment also includes a level of power regenerated by motor 16 through repeated movement of shifter 12 back to activate switch 30. Each time the driver pushes shifter 12 back activating switch 30 it sends a signal to processor 14 to increase the level of power regenerated from motor 16 to be stored in battery 18 thus slowing vehicle 10 and simulating downshifting. In this embodiment, reverse on vehicle 10 may be achieved through repeated movement of shifter 12 back to activate electronic switch 30 in quick succession. Preferably, when the driver moves shifter 12 back twice to activate electronic switch 30 within a span of 1 second vehicle 10 enters reverse. Although 1 second is preferred other timing delays may be used such as half a second, a quarter second, 2 seconds, or any other amount of delay between repeated movements of shifter 12 back to activate electronic switch 30.

Figure 2A:
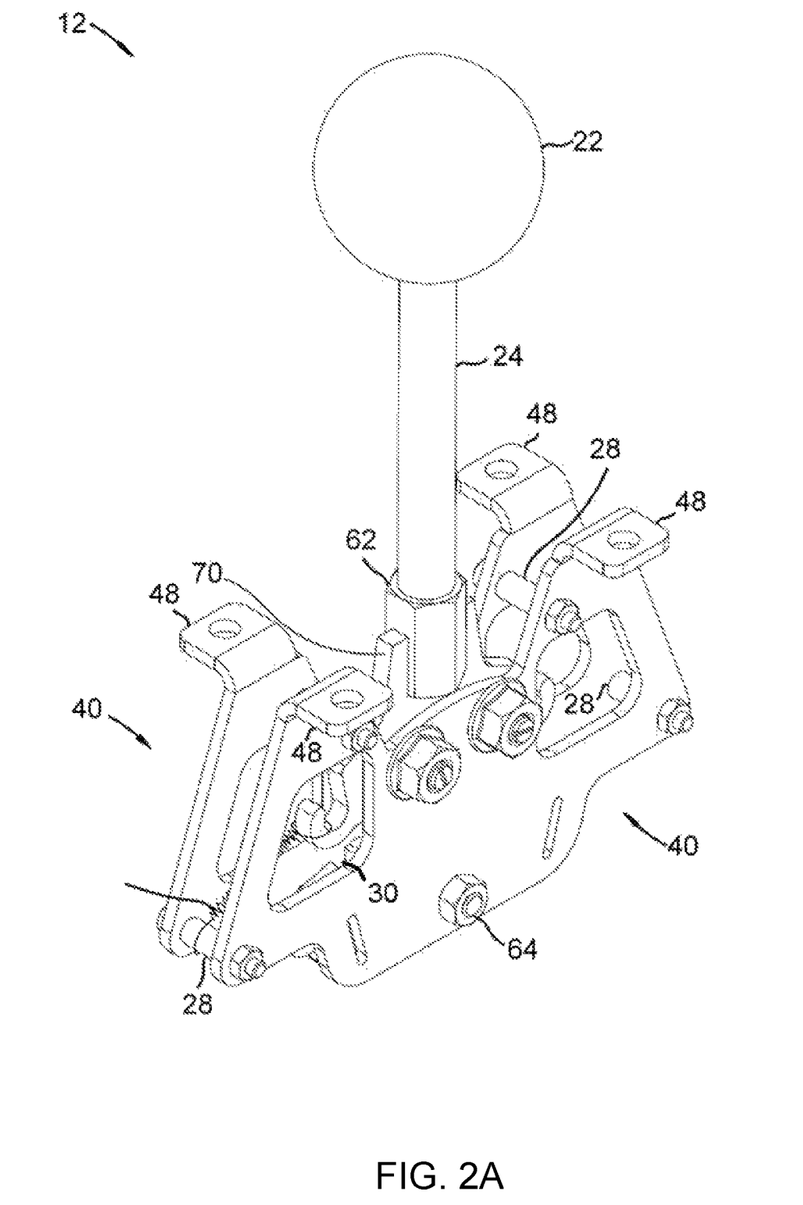
FIG. 2A is a perspective view of a shifter.
Figure 2B:
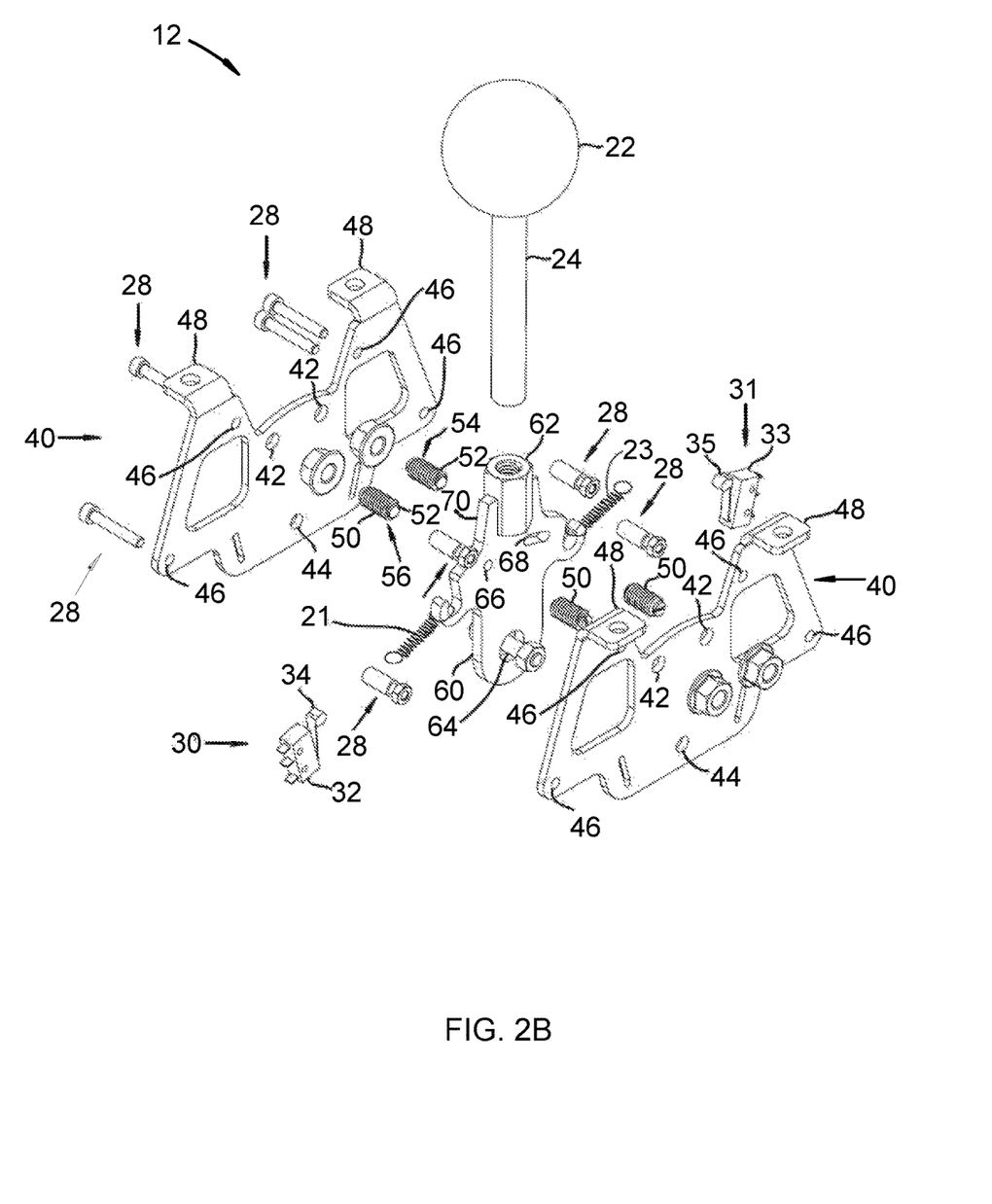
FIG. 2B is an exploded view of a shifter.

FIGS. 2A-2B depict one embodiment of shifter 12 according to the claimed invention. Shifter 12 includes handle 22, shaft 24, mounting plates 40, spacers 28, electronic switches 30, and equilibrium springs 21 and 23. Handle 22 and shaft 24 are made of any of a variety of materials. Handle 22 enables a user to manually grasp and actuate shifter 12.

The haptic feedback mechanism includes externally threaded bored cylinders 50 and base plate 60. Each mounting plate 40 includes cylinder openings 42, pivot opening 44, spacer openings 46, and mounting brackets 48. Additionally, each electronic switch 30 includes elongated body 32 and switch arm 34.

As depicted, the haptic feedback mechanism includes two sets of two cylinders 50. Each cylinder 50 includes metal sphere 52, closed end 54, open end 56, and a spring (not shown). The spring is disposed in the cylinder between sphere 52 and closed end 54. Open end 56 has a diameter smaller than the diameter of sphere 52, and the spring is compressed between sphere 52 and closed end 54, forcing sphere 52 against open end 56. Cylinder 50, metal sphere 52, and/or the spring are made of any of a variety of materials, including aluminum, steel, brass, other metal alloys, hardened molded plastic, and/or other suitable hardened plastics. The external threads on cylinder 50 secure cylinder 50 so that it can function as is described in more detail below. Preferably, the threads allow cylinder 50 to be adjustable. However, the cylinder does not need to be adjustable to be functional. Thus, in some embodiments, the cylinder is externally smooth, and includes a fixing member, such as one or more flanges and/or pins. Similarly, though in the depicted embodiment metal sphere 52 is biased against open end 56 by the spring, in other embodiments, the sphere is biased against the open end in some other fashion, such as pneumatically or hydraulically.

Base plate 60 is coupled to shaft 24 and includes elongated hexagonal nut 62, pivot rod 64, circular opening 66, and straight slot 68. As depicted, base plate 60 is made of laser-cut aluminum. However, base 60, in other embodiments, is made of other materials, including metals and hardened plastics. Nut 62 is welded to base plate 60 between prongs 70 that extend from base plate 60. However, in some embodiments, nut 62 is a molded, integral part of base plate 60. As shown, nut 62 is internally threaded and is an intermediary between base plate 60 and shaft 24, such that shaft 24 screws in to nut 62. As depicted, nut 62 is externally hexagonal to aid in tightening shaft 24 to base plate 60. However, in some embodiments, the shaft can mount to the nut in a variety of other ways. Alternatively, in some embodiments, the shaft and base plate are monolithic, or the shaft is otherwise joined directly to the base plate without the intermediation of a nut.

Pivot rod 64, which is disposed at an end of base plate 60 opposite nut 62, passes through base plate 60, and base plate 60 rotates about pivot rod 64. Pivot rod 64 is made of any of a variety of materials similar to those listed above for base plate 60, such as various metals, metal alloys, and hardened plastics. As shown, base plate 60 includes a pivot opening through which pivot rod 64 passes so that base plate 60 can rotate about pivot rod 64.

Circular opening 66 passes through base plate 60 and has a diameter smaller than spheres 52. Two cylinders 50, forming a first set, are disposed adjacent to circular opening 66 on opposite sides of circular opening 66 such that spheres 52 inside the first set rest inside circular opening 66 when base plate 60 is in the equilibrium position. Together, the first set of cylinders 50 and circular opening 66 form a first ball detent. The first detent resists rotation of base plate 60 from the equilibrium position, and rotation of base plate 60 away from the first detent causes a tactile "bump" or "pop" that imitates the tactile feedback of a manual transmission shifter as a gear is disengaged. Though in the depicted embodiment circular opening 66 is shown as passing through base plate 60, in general, circular opening 66 is an inset circular feature in base plate 60 having a diameter smaller than the diameter of a corresponding sphere 52. The corresponding sphere 52 forms contact with an edge of the circular feature as the base is in the equilibrium position, and motion away from the equilibrium position causes the edge to force the sphere 52 against the spring into cylinder 50. In some embodiments, the circular feature is a concave depression in base plate 60. In the same and/or other embodiments, the circular feature includes a raised edge around the depression that enhances the tactile feedback. In other embodiments the springs may be removed, and the shifter has no equilibrium position. Instead the shifter remains in the position it is moved to by the driver when sphere 52 is moved in to the second detent.

Straight slot 68 includes rounded ends and passes through base plate 60. Straight slot 68 and circular opening 66 are aligned tangentially to a circumference about pivot rod 64. Two cylinders 50, forming a second set of cylinders, are disposed adjacent to straight slot 68 on opposite sides of straight slot 68 such that spheres 52 inside the second set of cylinders 50 rest inside slot 66 when base plate 60 is in the equilibrium position, and as the first set of spheres 52 move past circular opening 66. Slot 66 has a width smaller than the diameter of the corresponding spheres 52 and a length greater than the diameter of the corresponding spheres 52 and circular opening 66 such that, as base plate 60 moves past the first detent, the second set of spheres 52 slide in straight slot 68. In some embodiments the length of the straight slot ranges from more than once the diameter of the corresponding spheres to five times the diameter of the corresponding spheres. The second set of cylinders 50 are disposed adjacent to and centered over straight slot 68 such that the corresponding spheres 52 form contact with the top and bottom edges of straight slot 68 as the base is in the equilibrium position. Together, the second set of cylinders 50 and straight slot 68 form a second ball detent. The second detent resists rotation of base plate 60 away from the equilibrium position after base plate 60 moves past the first detent. Rotation of base plate 60 away from the second detent causes a tactile "bump" or "pop" that imitates the tactile feedback of a manual transmission shifter as a gear is engaged. Though in the depicted embodiment straight slot 68 is shown as passing through base plate 60, in general, straight slot 68 is an inset, rounded slot feature in base plate 60. The corresponding sphere 52 forms contact with the edge of the slot feature as the base is in the equilibrium position, and motion away from the equilibrium position causes the spheres 52 to slide in straight slot 68 until they meet, and move past, the rounded ends of straight slot 68. In some embodiments, the slot feature is a concave depression in base plate 60. In the same and/or other embodiments, the slot feature includes a raised edge around the depression that enhances the tactile feedback.

Circular opening 66 and straight slot 68 are spaced apart along the circumference by, in the depicted embodiment, more than a distance equal to the length of straight slot 68. However, in some embodiments, the distance is approximately half the length of the straight slot, and in other embodiments, the distance is greater than the length of the straight slot. In some embodiments, the circular opening and the straight slot occupy positions on different circumferences about pivot rod 64. In such embodiments, it is important that the straight slot is at least three times the length of the diameter of the circular opening, to ensure proper "feel" imitating manual transmission feedback.

In the depicted embodiment, straight slot 68 has a length equal to four times the diameter of circular opening 66. The first and second set of cylinders 50 are aligned such that the second set is positioned over the lengthwise center of straight slot 68 as the first set is positioned over the center of circular opening 66. Rotation of base plate 60 about pivot rod 64 forces the first set of spheres 52 out of circular opening 66 and forces the second set of spheres 52 to slide along straight slot 68. Further rotation of base plate 60 about pivot rod 64 forces the second set of spheres 52 out of straight slot 68. As described above, forcing the first or second set of spheres 52 out of circular opening 66 or straight slot 68, respectively, creates a tactile feedback imitating manual transmission tactile feedback.

Mounting plates 40 are each disposed on an opposite side of base plate 60 from the other and are each parallel to base plate 60. Additionally, mounting plates 40 mount shifter 12 above, below, or through a vehicle surface. In some embodiments, the alignment between mounting plates 40 and base plate 60 is a design choice; in others it is necessary to ensure proper mounting and function. For example, in the depicted embodiment, the parallel arrangement is space-saving, and allows for positioning of shifter 12 in places shifter 1 might otherwise not be suitable. The depicted embodiment shows two-cylinder openings 42 that pass through each mounting plate 40. One-cylinder 50 from the first set of cylinders 50 passes through one cylinder opening 42, and one cylinder 50 from the second set of cylinders 50 passes through the other cylinder opening 42. In some embodiments, such as that depicted, each cylinder 50 is forced against base plate 60 by a nut 62 disposed on a side of each mounting plate 40 opposite base plate 60. However, in other embodiments, cylinder openings 42 are threaded. In other embodiments, cylinder openings 42 are excluded, and a first and second cylinder 50 form an integral part of each mounting plate 40.

Pivot rod 64 passes through pivot opening 44 in each mounting plate 40. As shown, pivot rod 64 is secured to mounting plates 40 by nuts. In some embodiments, bearings are also or alternatively included. Additionally, similar to cylinders 50 described above, in some embodiments, pivot rod 64 forms an integral part of mounting plates 40, and pivot opening 44 is excluded or completely filled by pivot rod 64.

Spacers 28 pass through four spacer openings 46 in each mounting plate 40. As shown, and similar to pivot rod 64, in some embodiments each spacer 28 is secured to each mounting plate 40 by a nut. In other embodiments, spacers 28 form an integral part of mounting plates 40. Spacers 28 are disposed between mounting plates 40 and prevent contact between base plate 50 and mounting plates 40, which is disposed between mounting plates 40. Other embodiments include more or fewer spacers. Additionally, in some embodiments, one or more of spacers act as stoppers that prevent over-rotation of the base plate past the second detent. In the depicted embodiment, two spacers 28 are disposed between mounting plates 40, one in front of base plate 60, and one behind base plate 60, such that opposing edges of base plate 60 press against the stopper-spacers 28 to prevent over-rotation of base plate 60.

Mounting brackets 48 are, in the depicted embodiment, disposed at an end of each mounting plate opposite pivot opening 44, and are aligned perpendicular to base plate 60. However, there are many variations of positioning and alignment of the mounting brackets on each mounting plate, each of which would satisfy various mounting conditions, and would be suitable for various mounting surfaces. For example, the depicted embodiment would be suitable for mounting shifter 12 in a vehicle dashboard, the shaft and handle extending from the dashboard.

Electronic switches 30 and 31 are disposed between, and mounted to, mounting plates 40. For example, in the depicted embodiment, there are two electronic switches 30 and 31, each slideably coupled to mounting plates 40 such that rotation of base plate 60 away from the equilibrium point in a first direction, such as forward, and past the second detent closes a forward switch 30, and such that rotation of base plate 60 away from the equilibrium point in a second direction, such as backwards, and past the second detent closes the other switch 31. As shown, pressure by base plate 60 against each switch 30 or 31 slides each to a stopping point.

Switches 30 and 31 close at the stopping point, and the stopping point is positioned such that it is reached by switches 30 and 31 past the second detent, or after the second set of spheres 52 moves out of straight slot 68.

As mentioned above, switch 30 includes elongated body 32 and arm 34, switch 31 includes elongated body 33 and arm 35. Arm 34 extends away from body 32 at an intersecting angle with body 32. Arm 35 extends away from body 33 at an intersecting angle with body 33. Each switch 30 and 31 is positioned such that a corresponding edge of base plate 60 is parallel to the body as rotation of base plate 60 forces arm 34 parallel to body 32 and closes switch 30. In the depicted embodiment, two equilibrium springs 21 and 23 are each coupled to, and between, at least one spacer 28 and prong 70 extending from base plate 60. One spring 21 is disposed in front of base plate 60, and one 23 is behind base plate 60, such that springs 21 and 23 return base plate 60 to the equilibrium position when base plate 60 is rotated in either direction about pivot rod 64. Each equilibrium spring 21 and 23 exerts a force on base plate 60 in the direction of the equilibrium position.

Figure 3A:
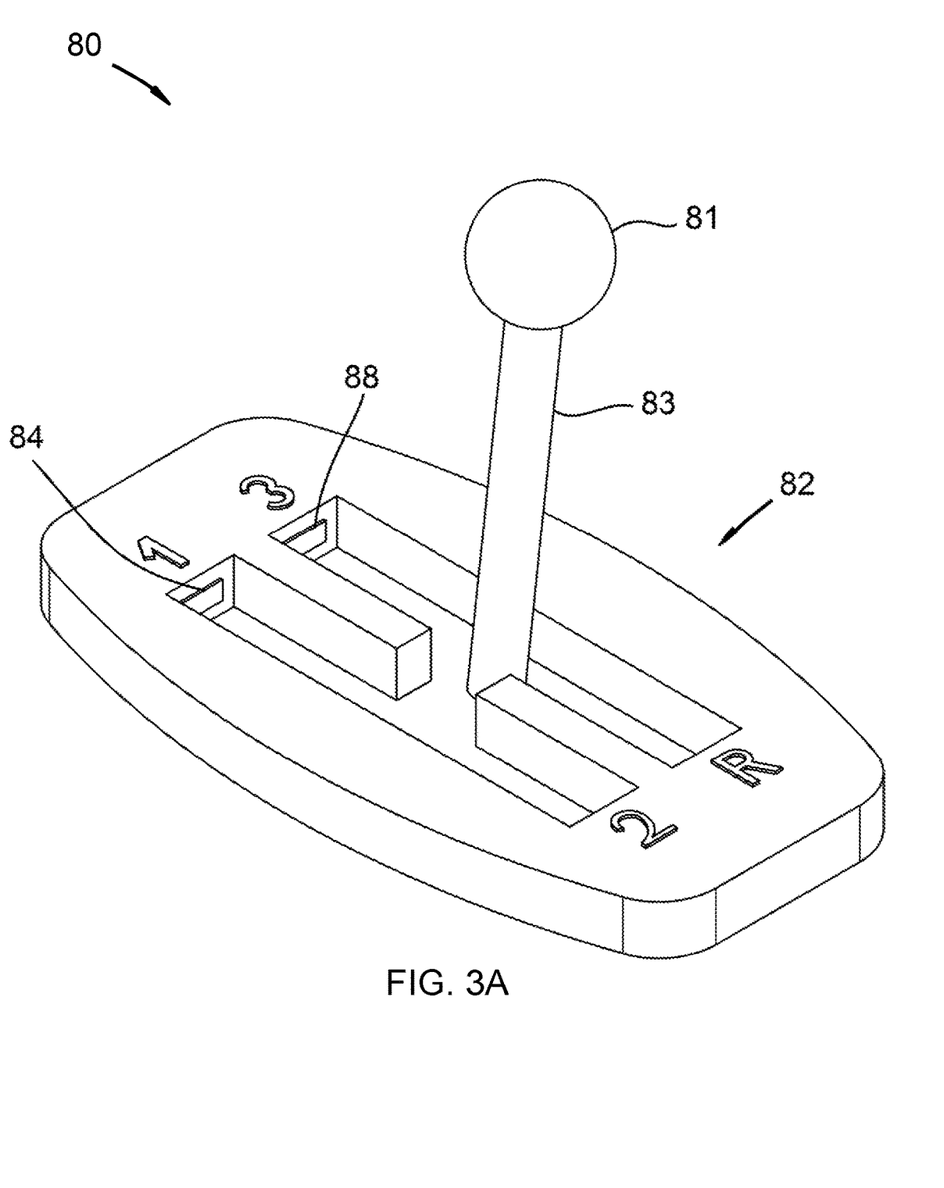
FIG. 3A is a perspective view of a shifter with multiple positions.
Figure 3B:
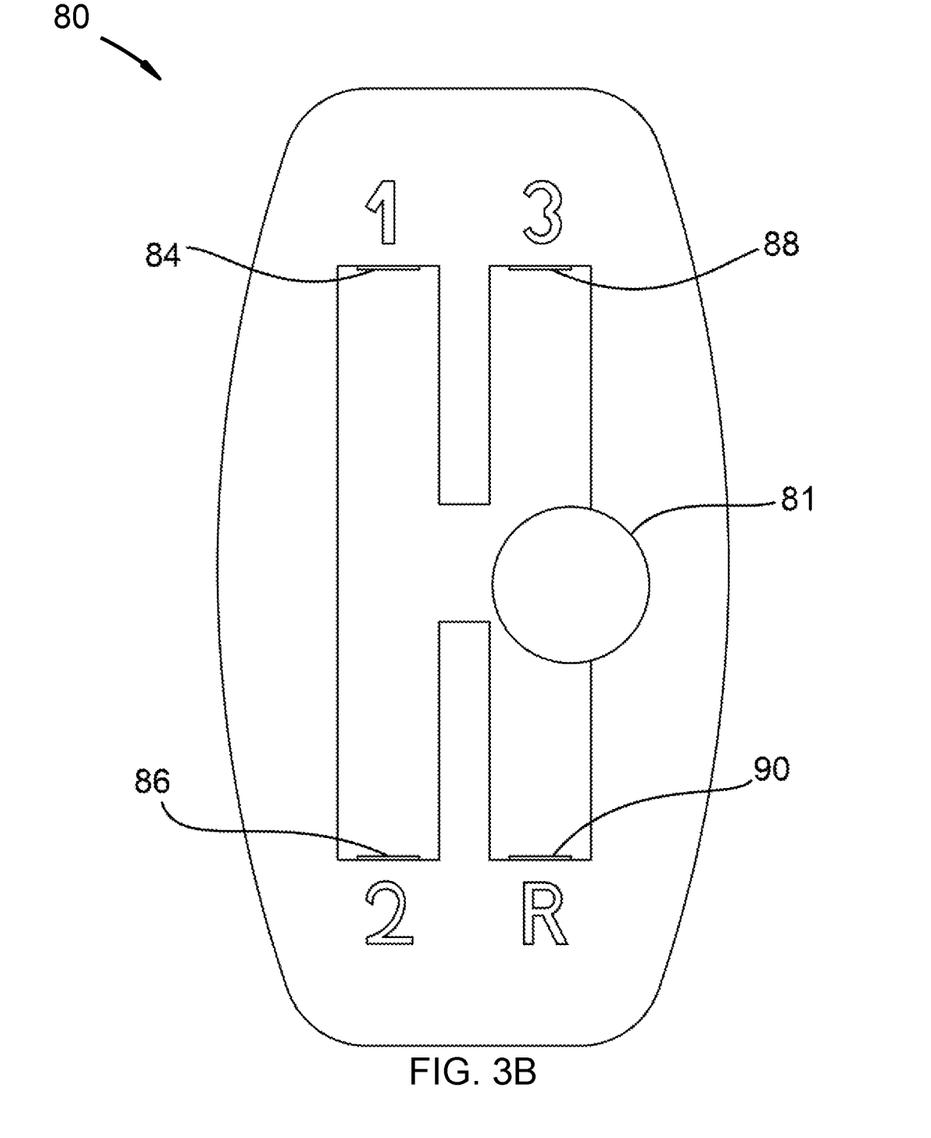
FIG. 3B is a top view of a shifter with multiple positions.

In FIGS. 3A-3B, shifter 80 is placed in a base 82 with different positions. Shifter 80 has handle 81 and shaft 83. Handle 81 and shaft 83 are made of any of a variety of materials. Handle 81 enables a user to manually grasp and actuate shifter 80. Each position contains a sensor. Sensor 84, 86, 88, and 90 are shown in position 1, position 2, position 3, and position R as shown in the image. The sensors are infrared sensors, optical sensors, pressure sensors or any other sensors capable of sending a signal to a processor. When shifter 80 is activating no sensor, it is considered a "neutral" position and with no signal from a sensor the processor sends a signal to the electric motor to disengage the electric motor. When shifter 80 is moved to position 1 from a "neutral" position where no sensor is activated it activates sensor 84 and sends a signal to the processor. The processor informs the electric motor to generate power to propel the vehicle forward at a percentage of power. When shifter 80 is moved to position 2 from position 1 or from a "neutral" position it activates sensor 86. Sensor 86 sends a signal to the processor. The processor sends a signal to the electric motor to draw power from the battery to propel the vehicle forward at a percentage of power higher than the percentage of power generated by the electric motor when in position 1. When shifter 80 is moved to position 3 from position 1, position 2, or a "neutral" position it activates sensor 88. Sensor 88 sends a signal to the processor. The processor sends a signal to the electric motor to draw power from the battery to propel the vehicle forward at a percentage of power higher than the percentage of power generated by the electric motor when in position 2. When shifter 80 is moved to position R from a "neutral" position it activates sensor 90. Sensor 90 sends a signal to the processor to put the vehicle in reverse. The processor will not put the vehicle in reverse if shifter 80 is moved from any other position.

When shifter 80 is moved from position 3 to position 2 it activates sensor 86 and sends a signal to the processor. When moved from position 3 to position 2 the processor sends a signal to reverse the electric motor to generate power as a regenerative motor to be stored in the battery thus slowing the vehicle at a percentage of power. When shifter 80 is moved from position 3 to position 1 or from position 2 to position 1 it activates sensor 84 and sends a signal to the processor. When moved from position 2 to position 1 or from position 3 to position 1 the processor sends a signal to reverse the electric motor to generate power as a regenerative motor to be stored in the battery thus slowing the vehicle at a percentage of power higher than the percentage of power generated by the electric motor when moving shifter 80 from position 3 to position 2.

In this embodiment depicted in FIGS. 3A-3B, base 82 has three positions to propel the vehicle forward but other embodiments have 4 or more positions. When shifter 80 is moved from a lower number position to a higher position or from a "neutral" position with no signal from a sensor to a numbered position activating a sensor it sends a signal to the processor. The processor informs the motor to generate power to propel the vehicle forward at a percentage of power. Each numbered position represents a higher percentage of power than the number which precedes it.

When shifter 80 is moved from a higher numbered position to a lower numbered position, such as from position 3 to position 2; it activates a sensor; such as sensor 86. The sensor informs the processor to reverse the electric motor to generate power as a regenerative motor to be stored in the battery thus slowing the vehicle at a percentage of power. Each lower position represents a percentage of power greater than the position which precedes it thus slowing the vehicle at a faster rate when shifter 80 is moved to that position from a higher position such as from position 3 to position 1.

In this embodiment base 80 has three positions to propel the vehicle forward and one position to propel the vehicle in reverse depicted as position "R". In other embodiments reverse may be achieved through the use of another invention disposed within the vehicle and the base only has positions to propel the vehicle forward. In other embodiments reverse may be achieved through repeated movement of the shifter into a position, such as position 1, in rapid succession.

When the driver moves shifter 80 to a position twice to activate an electronic sensor within a span of 1 second the vehicle enters reverse. Although 1 second is preferred other timing delays may be used such as half a second, a quarter second, 2 seconds, or any other amount of delay between repeated movements of shifter 80 to a position to activate a sensor.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A shifter for a vehicle driven by an electric motor powered by a battery comprising:
    a lever with one end adapted to accommodate the hand of a user and another end moveably attached to a base mounted on the vehicle;
    the base comprising a mechanism biasing the lever into an equilibrium position and providing haptic feedback when moved in one direction out of the equilibrium position, and at least one sensor adapted to detect when the lever is moved in the one direction and to send a downshift signal to a processor;
    the processor adapted to switch the motor to a power generation mode in response to the signal, thereby charging the battery and slowing the vehicle, thus simulating downshifting a manual transmission in a gas-powered vehicle.

2. The invention of claim 1 wherein the shifter and processor are configured to provide more than one downshift signal, whereby more than one level of power generation and resultant slowing of the vehicle can be selected by the user.

3. The invention of claim 2 wherein the more than one downshift signal are produced by repeated movement of the shifter in the one direction.

4. The invention of claim 1 wherein the shifter is also adapted to provide upshift signals to the processor, resulting in increasing levels of power provided to the motor, thus simulating upshifting a manual transmission in a gas-powered vehicle.

5. The invention of claim 4 wherein the upshift signals are produced by repeated movement of the shifter in a direction opposite the one direction.

6. The invention of claim 5 wherein the shifter is further configured to provide haptic feedback when moved in the direction opposite the one direction.

7. The invention of claim 4 wherein the upshift signals are produced by sensors detecting movement of the shifter to different positions.

8. The invention of claim 7 wherein the shifter is moved to at least three positions in sequence, and wherein moving the shifter in sequence from a first position to a second position to a third position simulates upshifting and moving the shifter in sequence from the third position to the second position to the first position simulates downshifting.

9. The invention of claim 8 wherein the shifter is further configured to provide haptic feedback when the lever is moved to the at least three positions.

10. A shifter for a vehicle driven by an electric motor powered by a battery:
    a lever with one end adapted to accommodate the hand of a user and another end moveably attached to a base mounted on the vehicle;
    the base comprising a mechanism providing haptic feedback when moved to one of a plurality of positions and a plurality of sensors adapted to detect when the lever is moved to one of the plurality of positions;
    the processor adapted to switch the motor to a level of power according to the signal received by one of the plurality of sensors thus simulating shifting a manual transmission in a gas-powered vehicle.

11. The invention of claim 10 wherein the plurality of positions are numbered from a first position to a second position to further more positions.

12. The invention of claim 11 wherein selecting a position from a lower to a higher position represents upshifting and changes the level of power the motor uses in driving the vehicle.

13. The invention of claim 11 wherein selecting a position from a higher to a lower position represents downshifting and changes the level of power the motor generates to store in a battery and thus slowing the vehicle.

14. The invention of claim 11 wherein changing the position of the shifter is further configured to provide haptic feedback to the user.

15. The invention of claim 14 wherein the shifter is configured to provide haptic feedback to the user through detents in the base which resists movement of the shifter in to or from one of the plurality of positions.

* * * * *